United States Patent [19]

Barbee et al.

[11] 4,328,333

[45] May 4, 1982

[54] COPOLYESTERETHERS

[75] Inventors: Robert B. Barbee; Burns Davis, both of Kingsport, Tenn.

[73] Assignee: Eastman Kodak Company, Rochester, N.Y.

[21] Appl. No.: 257,449

[22] Filed: Apr. 24, 1981

[51] Int. Cl.[3] ............................................. C08G 63/66
[52] U.S. Cl. ................................... 528/301; 525/437; 528/302; 528/305
[58] Field of Search ............... 525/437; 528/301, 302, 528/305

[56] References Cited

U.S. PATENT DOCUMENTS

| | | | |
|---|---|---|---|
| 3,701,755 | 10/1972 | Sumoto et al. | 528/301 |
| 3,763,109 | 10/1973 | Witsiepe | 528/301 |
| 3,784,520 | 1/1974 | Hoeschele | 528/301 |
| 3,801,547 | 4/1974 | Hoeschele | 528/301 |
| 4,251,652 | 2/1981 | Tanaka et al. | 525/437 |

*Primary Examiner*—Lucille M. Phynes
*Attorney, Agent, or Firm*—John F. Stevens; Daniel B. Reece, III

[57] ABSTRACT

Disclosed are copolyesterethers that can be formed into bottles, tubing, film and the like having improved clarity. The copolyetheresters have an inherent viscosity of from 0.8 to about 2.0 and comprise A. a dicarboxylic acid component consisting essentially of terephthalic acid and an aliphatic or cycloaliphatic acid, and B. a diol component comprising
  (1) at least 70 mole percent 1,4-butanediol, and
  (2) from about 10 to about 60 weight percent, based on the weight of the polyetherester, of polypropyleneether glycol having a molecular weight of 1700 to 2400.

9 Claims, No Drawings

COPOLYESTERETHERS

BACKGROUND OF THE INVENTION

1. Field of the Invention

This invention relates to elastomeric copolyesterethers based on poly(butylene terephthalate) modified with polypropyleneether glycol and an aliphatic or cycloaliphatic acid which unexpectedly have improved clarity when molded into articles.

2. Description of the Prior Art

Copolyesterethers are well known in the art. It is also well known that increasing the molecular weight of the polyether glycol increases the crystallization rate of the polymer. However, use of high molecular weight polyethers results in inhomogeneity of the polymerization mass during melt condensation. This incompatibility of esterether segments produces phase separation resulting in polymer compositions having inferior physical properties. It is unexpected that modification of the copolyesterether with an aliphatic dicarboxylic acid allows the use of high molecular weight polyoxypropylene glycol and prevents phase separation during melt condensation.

U.S. Patents of interest which describe polyesterethers include U.S. Pat. Nos. 3,406,045; 3,576,773; 3,580,874; 3,023,192; 3,775,373; 3,663,653; 3,775,375; 3,261,812; 3,013,914; 3,763,109; 3,651,014; 4,003,882; 4,003,883; and British 1,421,610.

Of particular interest is U.S. Pat. No. 3,763,109 which broadly discloses copolyesterethers, including those prepared from dimethyl terephthalate, 1,4-butanediol and poly(propylene oxide) glycol having a molecular above 400. A second acid, such as an aliphatic or cycloaliphatic acid, may be used. This patent, however, does not suggest the importance of using the specific polyesterether according to this invention. Furthermore, at Column 4, Lines 50-55, it is suggested that when this particular polyesterether is used, the poly(propylene oxide) glycol preferably has a molecular weight of about 600-1600. It has now very surprisingly been found that in this particular polyesterether, if poly(propylene oxide)glycol (sometimes referred to herein as polyoxypropylene glycol or polypropyleneether glycol) having a molecular weight of about 1700-2400 (preferably about 1800-2200) is used, unexpected improved clarity in articles produced therefrom is realized. Thus, higher molecular weight polypropylene ether glycol can be used to result in faster crystallization rates of the copolyesterether.

DETAILED DESCRIPTION OF THE INVENTION

According to the present invention, a copolyesterether having an inherent viscosity of from about 0.8 to about 2.0 and improved clarity is provided. The copolyesterether is derived from A. a dicarboxylic acid component consisting essentially of about 50-92.5 mole % terephthalic acid and about 50-7.5 mole % of an aliphatic or cycloaliphatic dicarboxylic acid having from 2 to 40 carbon atoms, and B. (1) a diol component comprising at least 70 mole % 1,4-butanediol and
   (2) from about 10 to about 60% based on the weight of the copolyesterether, of a polypropylene ether glycol having a molecular weight of about 1700-2400.

Preferably, the copolyesterether contains about 60-80 mole percent terephthalic acid and about 40-20 mole percent of an aliphatic or cycloaliphatic dicarboxylic acid having 2 to 40 carbon atoms. Preferred aliphatic or cycloaliphatic dicarboxylic acids include adipic, dodecanedioic and 1,4-cyclohexanedicarboxylic acid, and dimer acid.

The diol component of the polyester comprises 1,4-butanediol and polypropylene ether glycol. The polypropylene ether glycol is present in an amount of about 10-60 weight percent, preferably about 20-50 weight percent, based on the weight of the copolyesterether. The polypropylene ether glycol has a molecular weight of about 1700-2400, preferably about 1800-2200.

The diol component of the copolyesterether may also contain up to about 30 mole percent of a second low molecular weight glycol having 2 to 5 carbon atoms. If a second low molecular weight glycol is used, it is preferably ethylene glycol, 2,2-dimethyl-1,3-propanediol or mixtures thereof.

The copolyesterethers of this invention can be prepared by the usual condensation processes and catalyst well known in the art. Useful catalyst are titanium and tin. After ester interchange with excess glycol, vacuum is applied to the heated polymer to remove excess glycol and form the high molecular weight polymer. Melt phase polycondensation can be used to prepare the high molecular weight polymer or a combination of melt and solid phase polymerization can be used. The reaction mixture is stirred at a temperature of about 175° C. to 220° C. for a period of 10 to 180 minutes. Heat is then increased to about 250° C. and the reaction mixture is put under reduced pressure to remove excess glycol. The heat is then removed and the reaction brought to atmospheric pressure. The reaction time is dependent on temperature, catalyst, glycol excess and equipment. Other esterification procedures will be obvious to those skilled in the art. For example, the polyoxypropylene glycol can be added to the reaction just before applying the reduced pressure. The polymers can also be prepared using a second low molecular weight glycol because this gives faster increase in molecular weight. Branching agents and terminating agents can also be used.

The term "consisting essentially of" is intended to include small amounts of other acids or glycols, e.g., up to about 5 mole percent. They may also contain from about 0.1 to about 2 mole percent of a conventional branching agent. The branching agent may be either tribasic acids, such as trimellitic anhydride or trimesic acid, or polyhydric alcohols, such as pentaerythritol, trimethylol propane, or polyoxypropyleneether triol.

The copolymer is then formed into pellets which are suitable for solid phase copolymerization.

The polycondensation step in the solid phase may be utilized to complete the polymerization of the copolyester or to carry it to a molecular weight higher than those achieved by melt condensation. At the end of the partial melt polycondensation as it is described above the copolyester typically has an inherent viscosity of at least 0.8. In order to achieve higher viscosity the copolyesterether particles are subjected to additional processing.

The particles should have a particle size not greater than about 5 mesh, preferably 5 to 20 mesh and most preferably 6 to 12 mesh as determined by the U.S. Bureau of Standards, Standard Screen Series. Much smaller particles, e.g., 100 mesh, can be used but are not preferred.

The particles required for the solid phase polycondensation can be formed by any conventional techniques. The partially condensed material from the melt can be cooled by casting on a cold wheel and shredding the resulting sheet. A preferred technique involves forming a strand of the melt, quenching it with cold water and cutting the strand into pellets of about 0.62 in. to 0.125 in. in diameter. The use of these large particles avoids many of the complications previously encountered with solid phase polycondensate.

The particles are subjected to a temperature of about 110°–200° C., preferably about 10° C. below the polymer stick temperature for a period of about 1 to 72 hours, usually for about 4 to 48 hours. Significant advantages are realized by increasing the inherent viscosity at these relatively low temperatures at which little or no thermal degradation occurs to cause odor and color formation.

The solid phase polycondensation takes place in an inert gas stream or in a vacuum. Preferred inert gas streams are nitrogen, carbon dioxide and carbon monoxide. When an inert gas stream is used, the pressure may range from reduced pressures as low as about 1 mm. Hg up to superatmospheric pressure, but operation at about 1 atmosphere is preferred. If vacuum is to be utilized alone a pressure of less than about 1 mm. Hg should be maintained. The use of an inert gas stream or vacuum is essential to remove polymerization by-products, normally the low molecular weight diol, from the space surrounding the copolyester particles as the polymerization is reversible in the presence of the by-products. The use of an inert gas stream at about atmospheric pressure is preferred.

The solid phase polycondensation can be carried out in batch and continuous equipment such as fixed bed reactors, rotating reactors, moving bed reactors and fluid-bed reactors. The solid phase polycondensation reaction is continued until the desired inherent viscosity of from 0.8 to about 2.0 is reached. The course of the reaction may be followed by removing samples periodically and determining their inherent viscosity. If a correlation has been developed between inherent viscosity and melt index for the copolyester being prepared, the melt index of periodic samples can be used to follow the reaction.

The properties of these copolyesterethers can also be modified by incorporation of various conventional additives such as carbon black, silica gel, alumina, clays, chopped fiber glass and mold release agents. In general, these additives have the effect of increasing the modulus of the material at various elongations. Compounds having a range of hardness values can be obtained by blending hard and soft polymers of this invention. Additionally, if desired, stabilizers may be added.

If desired, conventional cross-linking agents such as polyfunctional compounds containing 3 or more functional groups (for example hydroxyl, carboxyl or esters thereof) may be used as part of the acid or glycol components in amounts of up to about 5 mol percent. When crosslinking agents are used, it is preferred to use from about 0.1 to about 2 mol percent. Trimellitic anhydride may be used as a small portion of the acid component.

The following examples are submitted for a better understanding of the invention.

EXAMPLE 1

Poly(1,4-butylene terephthalate) modified with 0.6 mole percent trimellitate, 30 mole percent 1,4-cyclohexanedicarboxylate, and 25 weight percent of polyoxypropylene glycol of 2000 molecular weight is prepared by stirring with heating 69.27 grams of dimethyl terephthalate, 30.82 grams of 77% cis dimethyl 1,4-cyclohexanedicarboxylate, 58.02 grams of 1,4-butanediol, 0.61 grams of trimellitic anhydride, 37.54 grams of polyoxypropylene glycol, 0.45 grams of conventional antioxidant (Irganox 1010), and 100 parts per million of titanium from titanium tetraisopropoxide. The reaction is kept under nitrogen at 215° C. for 60 minutes while the methanol distills. The temperature is raised to 250° C., the nitrogen is removed, and a vacuum is applied to the reaction to remove excess glycol. The melt condensation is continued at 250° C. under 0.15 millimeters of mercury pressure for 30 minutes. The heat is removed and the reaction mixture is let down to atmospheric pressure with nitrogen. The final polymer has an inherent viscosity of 1.07.

EXAMPLE 2

In this example, the procedure of Example 1 is repeated except no aliphatic dicarboxylic acid is used.

Poly(1,4-butylene terephthalate) modified with 0.6 mole percent trimellitate and 25 weight percent of polyoxypropylene glycol of 2000 molecular weight is prepared by stirring with heating 100.05 grams of dimethyl terephthalate, 58.51 grams of 1,4-butanediol, 0.61 grams of trimellitic anhydride, 37.54 grams of polyoxypropylene glycol, 0.45 grams of Irganox 1010, and 100 parts per million of titanium from titanium tetraisopropoxide. The reaction is kept under nitrogen at 215° C. for 60 minutes while the methanol distills. The temperature is raised to 250° C., the nitrogen is removed, and a vacuum is applied to the reaction to remove excess glycol. The melt condensation is continued at 250° C. under 0.15 millimeters of mercury pressure for 20 minutes during which time the melt becomes opaque. The heat is removed and the reaction mixture is let down to atmospheric pressure with nitrogen. The final polymer has an inherent viscosity of 0.95.

Table 1 clearly shows that the copolyesterether containing 2000 molecular weight polyoxypropylene glycol and which is modified with an aliphatic dicarboxylic acid as described in Example 1 has superior physical properties to a copolyesterether containing 2000 molecular weight polyoxypropylene glycol but no aliphatic acid as described in Example 2.

TABLE 1

|  | Example 1 | Example 2 |
|---|---|---|
| Appearance of melt | Translucent | Opaque |
| Break strength of 10 mil film, psi | 2,300 | 1,900 |
| Elongation at break of pressed film, % | 522 | 30 |

Examples 3–11 illustrate the effect of using various molecular weights of polypropyleneether glycol, as well as comparing its use with polytetramethyleneether glycol, in polyesterethers.

| | | Polyether Molecular Weight | | | | | |
|---|---|---|---|---|---|---|---|
| | | 1000 | | 2000 | | 3000 | |
| Ex. | Poly-Ether | Aliphatic or Cycloaliphatic Acid | Polymer Melt | Aliphatic or Cycloaliphatic Acid | Polymer Melt | Aliphatic or Cycloaliphatic Acid | Polymer Melt |
| 3 | PPG | None | Clear | None | Opaque | | Opaque |
| 4 | PPG | H | Clear | H | Clear | H | Opaque |
| 5 | PPG | I | Clear | I | Opaque | I | Opaque |
| 6 | PPG | | | D | Clear | | Opaque |
| 7 | PPG | | | R | Clear | | Opaque |
| 8 | PPG | | | P | Opaque | | Opaque |
| 9 | PTMG | None | Clear | None | Opaque | | Opaque |
| 10 | PTMG | H | Clear | H | Opaque | | Opaque |
| 11 | PTMG | I | Clear | I | Opaque | | Opaque |

H - 1,4-cyclohexanedicarboxylate
I - isophthalic acid
D - adipic acid
R - 1,12-dodecanedioc acid
P - phthalic acid
PPG - polypropylene ether glycol
PTMG - polytetramethylene ether glycol As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. A copolyesterether comprising
   A. a dicarboxylic acid component consisting essentially of about 50–92.5 mole % terephthalic acid and about 50–7.5 mole % of another aliphatic or cycloaliphatic dicarboxylic acid having from 2 to 40 carbon atoms, and
   B. (1) a diol component comprising at least 70 mole % 1,4-butanediol and
   C. (2) from about 10 to about 60% based on the weight of the copolyesterether, of a polypropylene ether glycol having a molecular weight of about 1700–2400.

2. A copolyesterether according to claim 1 having an I.V. of about 0.8 to about 2.0.

3. A copolyesterether according to claim 1 wherein the molecular weight is between about 1800 and about 2200.

4. A copolyesterether according to claim 1 wherein the aliphatic or cycloaliphatic dicarboxylic acid is selected from the group consisting of adipic, dodecanedioic, 1,4-cyclohexanedicarboxylic and dimer acid.

5. A copolyesterether according to claim 1 wherein the polypropylene ether glycol is present in an amount of from about 20 to about 50 weight percent, based on the weight of the copolyesterether.

6. A copolyesterether according to claim 1 wherein the diol component comprises from about 0.5 to about 30 mole % of a low molecular weight glycol having 2 to 6 carbon atoms.

7. A copolyesterether comprising
   A. a dicarboxylic acid component consisting essentially of about 50–92.5 mole % terephthalic acid and about 50–7.5 mole % of another aliphatic or cycloaliphatic dicarboxylic acid having from 2 to 40 carbon atoms, and
   B. (1) a diol component comprising at least 70 mole % 1,4-butanediol and
   (2) from about 10 to about 60% based on the weight of the copolyesterether, of a polyoxypropylene glycol having a molecular weight of about 1800–2200.

8. A film or molded article comprising the copolyesterether of claim 1.

9. A film or molded article comprising the copolyesterether of claim 7.